Feb. 10, 1942.  H. C. SWIFT  2,272,360

FLUID PRESSURE BOOSTER

Filed Aug. 12, 1939

INVENTOR.
HARVEY C. SWIFT
BY
ATTORNEY.

Patented Feb. 10, 1942

2,272,360

UNITED STATES PATENT OFFICE 2,272,360

FLUID PRESSURE BOOSTER

Harvey C. Swift, Detroit, Mich., assignor to Hydraulic Brake Company, Detroit, Mich., a corporation of California Application August 12, 1939, Serial No. 289,875

6 Claims. (Cl. 60—54.6)

This invention relates to fluid pressure braking systems, and more particularly to fluid pressure boosters for such systems.

Broadly the invention comprehends a fluid pressure braking system including a pressure producing device, a fluid pressure actuated motor connected thereto, braking elements actuated by the motor, and a fluid pressure booster connected between the pressure producing device and the motor operative to step up pressure on the fluid in the motor after attaining a predetermined pressure on the fluid in the system.

An object of the invention is to provide a fluid pressure braking system for a motor vehicle operative to automatically increase the braking effect upon attaining a predetermined pressure on the fluid in the system.

Another object of the invention is to provide a fluid pressure booster of simplified structure including a double-end telescopic piston subjected to opposed pressures, and a controlled passage through the piston.

Figure 1:
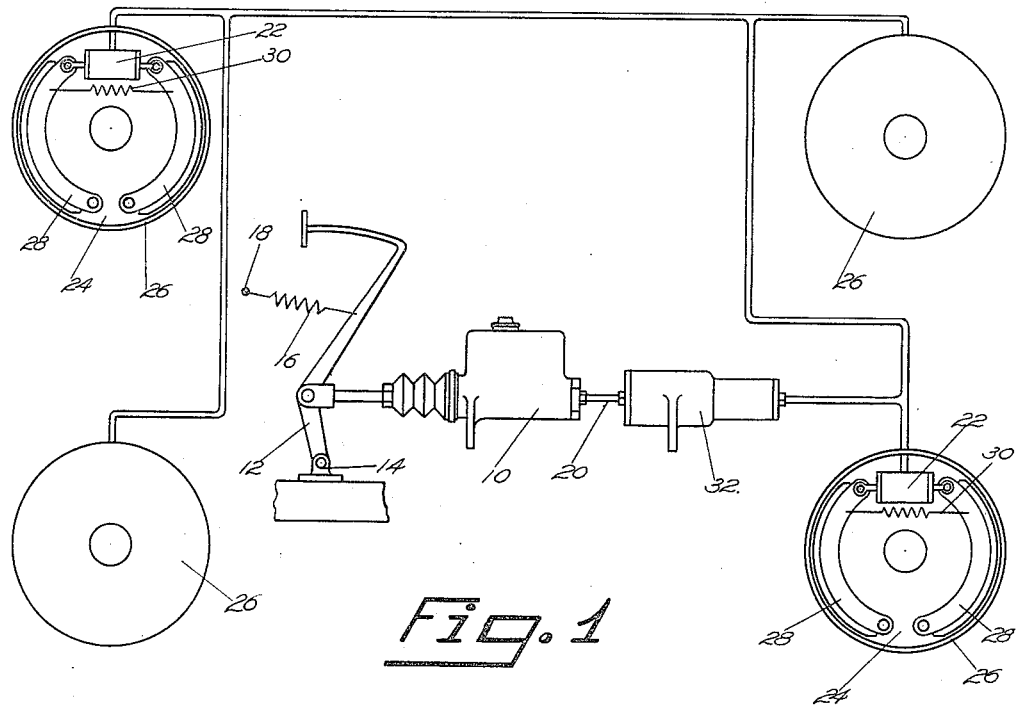
Figure 2:
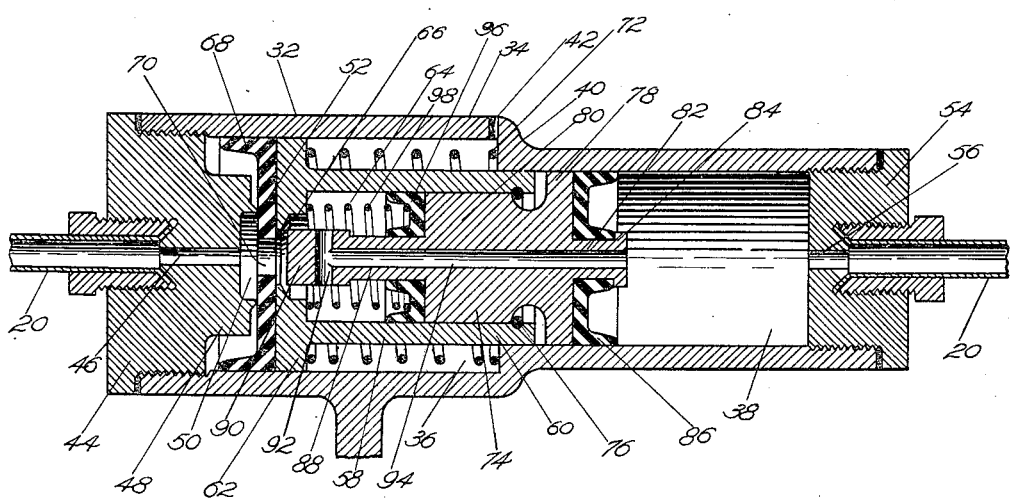

Other objects of the invention will appear from the following description taken in connection with the drawing forming a part of this specification, and in which, Fig. 1 is a schematic view of a fluid pressure braking system embodying the invention; and Fig. 2 is a longitudinal sectional view of the pressure compounding device.

Referring to the drawing for more specific details of the invention, 10 represents a fluid pressure producing device of conventional type, preferably actuated by a foot pedal lever 12, pivoted on a suitable support 14 and connected as by a retractile spring 16 to a fixed support 18.

A fluid pressure delivery pipe or conduit 20 suitably connected to the discharge port of the fluid pressure producing device 10 has branches connected to fluid pressure actuated motors 22, preferably arranged in pairs, one pair for actuating the brakes associated with the front wheels of a vehicle, and another pair for actuating the brakes associated with the rear wheels of the vehicle.

The brakes may be of conventional type, each including a fixed support or backing plate 24 adapted to be secured to an axle or to an axle housing, a rotatable drum 26 associated with the backing plate and adapted to be secured to a wheel, a pair of corresponding interchangeable friction elements or shoes 28 pivoted on the backing plate for cooperation with the drum, a retractile spring 30 connecting the shoes, and a motor corresponding to the motors 22 mounted on the backing plate between the shoes and operative to actuate the shoes into engagement with the drum against the resistance of the retractile spring.

A fluid pressure booster, indicated generally at 32, is connected in the fluid pressure delivery pipe or conduit 20. The booster includes a cylinder 34 having a large chamber 36 and a relatively small chamber 38 arranged concentrically to and in direct communication with one another. At the junction of the cylinders is an annular shoulder 40, and arranged in the wall of the large chamber 36 adjacent the shoulder is an opening 42 for venting the chamber 36 to the atmosphere.

The outer end of the large chamber 36 is closed by a suitable head 44 having a port 46 connected to that section of the fluid pressure delivery pipe 20 leading direct from the fluid pressure producing device 10. The head 44 has a concentric extension 48 projecting into the chamber 36. In the free end of this extension is a concentric recess or chamber 50 communicating with the port 46, and part of the wall defining the recess is extended to provide an annular valve seat 52. The outer end of the small cylinder is closed by a head 54 having a port 56 connected to that section of the fluid pressure delivery pipe or conduit 20 leading to the fluid pressure actuated motors 22.

A piston 58 reciprocable in the chambers 36 and 38 of the cylinder includes a shell 60 complementary to the bore of the small chamber 38, and a head 62 complementary to the bore of the large chamber 36. The shell provides a chamber 64, and the head has a concentrically disposed port 66 providing a communication between the chamber 64 and that portion of the chamber 36 forward of the piston. The head has thereon a sealing cup 68 provided with a concentrically disposed opening 70. The perimeter defining this opening overhangs the port 66 in the head of the cylinder, and a heavy spring 72 interposed between the back of the piston head 62 and the annular shoulder 40 normally retains the piston on the valve seat 52. The spring 72 is of such elasticity that upon closing port 66 the area of the piston 62 exposed to the pressure on the fluid in the chamber 50 is adequate to compress the spring 72.

A piston 74 reciprocable in the chamber 38 and the chamber 64 is held against displacement by a retaining ring 76 seated in a groove in the wall of the chamber adjacent the open end thereof. The piston 74 includes a head 78 complementary to the bore of the chamber 38 and a body portion 80 complementary to the bore of the shell 58. The head 78 has a concentric extension 82 provided at its free end with a peripheral flange 84, and a sealing cup 86 seated on the head is held against displacement by the flange. The body portion of the piston 74 has a concentric extension 88 provided at its free end with an enlarged head 90 adapted to enter and close the port 66 in the head of the piston 58 and to engage the overhanging perimeter of the cup 68 so as to effectively seal the port. The head 90 on the extension 88 has a diametral passage 92, and a passage 94 communicating with this passage extends concentrically through the piston 74 and its extensions 82 and 88. The passages 92 and 94 provide communication between that portion of the chamber 64 back of the piston 74 and that portion of the chamber 38 forward of the piston. A sealing cup 96 sleeved on the extension 88 and seated on the back of the piston 74 inhibits seepage of fluid from the chamber 64 past the piston, and a light spring 98 interposed between the cup 96 and the back of the piston head 62 normally urges the piston 74 forward against the retaining ring 76 so as to normally maintain the port 66 open and to inhibit premature closing of the port.

In a normal operation, upon depressing the foot pedal lever 12, the fluid pressure producing device 10 is actuated. This results in displacement of fluid from the device through the fluid pressure delivery pipe or conduit 20, the booster 32, and the respective branches of the fluid pressure delivery pipe, into the fluid pressure actuated motors 22, causing actuation of the motors and the resultant movement of the shoes 28 into engagement with the drums 26 against the resistance of the retractile springs 36.

Fluid under pressure enters the booster 32 through the port 46, thence through the recess 50, the opening 70 in the sealing cup 68 and the port 66 in the head of the piston 58, into the chamber 64, and flows from this chamber through the passages 92 and 94 into the chamber 38, thence through the fluid pressure delivery pipe 20 and its branches, to the motors 22.

When the pressure on the fluid in the chamber 38 reaches a predetermined pressure, approximately five hundred pounds, the pressure reaction on the piston 58 causes this piston to advance against the resistance of the spring 72 to thereby move the piston 58 from the valve seat 52. The relative movement resulting between piston 58 and piston 74 permits the movement of the head 90 on the extension 88 into the port 66 so as to effectively close the port, and, thereafter, the pressure on the fluid is received on the head 62 of the piston 58, and, because of the large area of the head 62 of the piston 58, the pressure on the fluid in the system forward of the piston 74 is boosted or stepped up.

Upon conclusion of a braking operation, and release of the applied force, the foot pedal lever 12 returns to its retracted position under the influence of the retractile spring 16. This results in release of the pressure on the fluid in the pressure producing device 10, and, accordingly, in the booster 32. Upon release of pressure on the fluid in the booster, the piston 58 of the booster is returned to its seat 52 under the influence of the spring 72. This results in opening the port 66 and establishing communication between the chamber 38 and the intake port 46 by way of the chamber 64 and passages 92 and 94. With the establishment of free communication through the booster 32, fluid is returned to the fluid pressure device 10 from the fluid pressure actuated motors and fluid pressure delivery pipe 20 and its branches under the influence of the retractile springs 30.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is,

1. A fluid pressure booster comprising a double diametral cylinder, a piston reciprocable therein including a shell having a head complementary to the large diameter of the cylinder and a port in the head, a member reciprocable in the shell having a passage therethrough, a head on one end of the member complementary to the small diameter of the cylinder, and a part on the other end of the member for control of the port.

2. A fluid pressure booster comprising a double diametral cylinder, a head closing the large end of the cylinder having an inlet port, an extension on the head projecting into the cylinder and providing a valve seat, a telescopic piston reciprocable in the cylinder having a passage therethrough, oppositely disposed heads on the piston one complementary to the large diameter of the cylinder and the other complementary to the small diameter of the cylinder, cooperative parts carried by the piston for control of the passage, and means for normally retaining the piston on the seat on the head of the cylinder.

3. A fluid pressure booster comprising a double diametral cylinder, a head closing the large end of the cylinder having an extension projecting into the cylinder and providing a valve seat, a piston reciprocable in the cylinder having telescopic parts provided with heads complementary to the large and small diameters of the cylinder and a passage therethrough controlled by relative movement of the parts, means normally urging the piston to its retracted position on the seat, and means normally extending the piston to open the passage.

4. A fluid pressure booster comprising a cylinder having a larger chamber and a relatively small chamber, a piston having a head complementary to the large chamber and reciprocable therein, said piston including a hollow body portion and a passage through the head thereof communicating with the chamber formed by the hollow portion, a piston having a head on its one end oppositely disposed to the head on the piston reciprocable in the large chamber complementary to the small chamber, and a relatively smaller head on its other end reciprocable in the hollow of the large piston, said piston reciprocable in the smaller chamber telescoping the large piston and movable relative thereto having a passage therethrough, and parts on the pistons cooperating to control the passages through the pistons.

5. A fluid pressure booster comprising a cylinder having a large chamber and a small chamber, a head on the large chamber having an inlet port therethrough and communicating with the interior of the cylinder, pistons having heads complementary to the respective large and small chambers of the cylinder and reciprocable therein, a relatively smaller head on the piston reciprocable in the small chamber reciprocable within and relative to the piston of the large chamber, passages through the pistons normally providing communication between the inlet port and small chamber, and means carried by the pistons for control of the passages.

6. A fluid pressure booster comprising a cylinder having a large chamber and a relatively small chamber, telescoped pistons reciprocable within their respective chambers movable relative to one another, oppositely disposed heads on the pistons complementary to their respective chambers, another head on the piston of the small chamber relatively smaller than the chamber head thereof disposed within the piston of the large chamber, said pistons having passages therethrough, and cooperative means on the pistons for control of the passages.

HARVEY C. SWIFT.